United States Patent Office 2,726,269
Patented Dec. 6, 1955

2,726,269
METHOD OF MAKING ACETYLENIC CARBINOLS

Wilbert J. Humphlett, Rochester, N. Y., assignor to Eastman Kodak Company, Rochester, N. Y., a corporation of New Jersey No Drawing. Application September 11, 1951,
Serial No. 246,168

16 Claims. (Cl. 260—615)

This invention relates to methods of making acetylenic carbinols and is particularly concerned with condensing ketones with propinyl halides to form acetylenic carbinol condensation products.

In organic syntheses, the propinyl halides such as propargyl bromide, propargyl chloride, propargyl iodide and the like are useful materials for building up a carbon chain, particularly an unsaturated chain. Heretofore, propinyl halides have been condensed with ketones by means of zinc, but efforts to employ magnesium as the condensing agent have failed due to side reactions such as allylic rearrangements or coupling of the propinyl halides themselves, as shown by Prevost et al., Comp. Rend., 230, 1186–8 (1950).

It is accordingly an object of this invention to provide a new method of condensing propinyl halides with ketones to form acetylenic carbinols in increased yield.

Another object of the invention is to provide a new method whereby magnesium is employed in the condensation of a ketone with a propinyl halide.

Another object of the invention is to replace zinc as condensing agent in making acetylenic carbinols and thereby increasing the yield.

Another object of the invention is to provide a new method of condensing β-ionone with a propinyl halide.

Another object of the invention is to provide a new method of condensing acetals of acetoacetaldehyde with propinyl halides.

Another object of the invention is to facilitate organic syntheses.

Another object of the invention is to provide an improved method of making valuable intermediates in the synthesis of vitamin A.

Other objects will be apparent from the description and claims which follow.

These and other objects are attained by means of this invention which comprises condensing a ketone with a propinyl halide in the presence of mercury-catalyzed magnesium, and hydrolyzing the resulting condensation product to an acetylenic carbinol.

Prior to this invention, attempts to employ magnesium in condensations between a propinyl halide and a ketone failed to give the desired results. Attempts to remedy the difficulty by use of such catalysts as methyl iodide, iodine and copper acetoacetate also failed, even though such materials are commonly employed to promote the condensation with zinc.

By means of this invention, however, ketones, both saturated and unsaturated and both alicyclic and acyclic, are readily condensed with propinyl halides in improved yield by means of mercury-catalyzed magnesium and the resulting condensation product hydrolyzed to an acetylenic carbinol. Magnesium catalyzed by mercury, which is added as a mercury-containing material such as a mercury salt or other source of mercury effectively promotes the condensation with no objectionable coupling of the propinyl halide. The mercury appears to catalyze the magnesium by forming a mercury amalgam although the mechanism is not understood exactly and it will be understood that it is not intended that the scope of the invention be limited by any theory which might be advanced herein.

Magnesium can be employed in any of the well-known forms which are available for chemical reactions such as powder, turnings, foil, and the like. Mercury can be added as a preformed amalgam with magnesium, as metallic mercury, as a mercury salt such as mercuric chloride, mercuric nitrate, or the like, or in any other convenient form. The amount of mercury necessary is not critical, and catalytic or trace amounts are sufficient although larger amounts do not deleteriously affect the reaction.

The process embodying the invention can be carried out with any of the well-known ketones, whether saturated or unsaturated, alicyclic or acyclic. Thus, for example, the condensation proceeds in a highly satisfactory manner with such diverse aliphatic ketones as the alicyclic unsaturated ketone, β-ionone, and the saturated acyclic acetals of acetoacetaldehyde. Other ketones which are typical of those suitable for practicing the invention include methyl vinyl ketone, trimethyl cyclohexanone, acetophenone, methyl ethyl ketone, and any of the other well-known ketones.

These and other ketones are condensed in accordance with this invention with any of the well-known propinyl halides; propargyl bromide and propargyl iodide being eminently suitable and preferred to the explosively unstable propargyl chloride.

The condensation product which is largely in the form of the magnesium complex is readily hydrolyzed to the desired acetylenic carbinol by the addition of water, dilute acid, or ammonium salt solution.

The propargyl halides form desirable materials for vitamin A syntheses where the desired compounds contain an isoprenic grouping. The invention also facilitates the synthesis of other terpenoid materials such as farnesol and geraniol and the like, as well as such materials as phytol and the like.

The invention is illustrated by the following examples of preferred embodiments thereof.

Example 1

A mixture of 1.2 g. of magnesium foil and 75 mg. of mercuric chloride in 10 ml. of absolute ether was charged into a 200 ml. 3-necked flask equipped with a stirrer, reflux condenser and dropping funnel. A mixture of 9.1 g. of β-ionone and 5.9 g. of propargyl bromide was dissolved in 35 ml. of absolute ether and added to the charge in the flask. The resulting mixture was warmed to gentle reflux while being stirred and the reaction commenced in about 5–10 minutes. The heat was removed and the reaction was controlled with an ice water bath. The reaction mixture refluxed spontaneously for 30 minutes and was then heated to reflux for an additional 30 minutes forming a clear light yellow solution. The magnesium complex was decomposed by the cautious addition of 5% sulfuric acid while the mixture was cooled in ice water. The ether phase was separated from the aqueous phase, and the aqueous phase was saturated with sodium chloride and extracted three times with ether. The combined ether phases were washed with sodium bicarbonate solution, dried over sodium sulfate and the ether removed by evaporation to give 11.25 g. of 4-methyl-4-hydroxyl-6-(2,6,6-trimethyl cyclohex-1-enyl) hexa-5-ene-1-yne as a yellow slightly viscous product having $$E_{1\ cm.}^{1\%} (232\ m\mu) = 234$$

The product was further purified by chromatography to give 10.57 g. or a 97% yield of product having $$E_{1\ cm.}^{1\%} (232\ m\mu) = 240$$

Example 2

The condensation proceeded in similar fashion with propargyl iodide. A 0.6 g. portion of magnesium turnings was placed in a suitable reaction flask. To this was added, all at once, a mixture of 4.55 g. of β-ionone, 4.1 g. of propargyl iodide, 0.035 g. of mercuric chloride, and 25 ml. of dry ether. The resulting reaction mixture was heated at 60° C. until the reaction was initiated. The mixture was then cooled in an ice bath and refluxed spontaneously for 30 minutes, after which time it was refluxed on an oil bath for an additional 45 minutes. The mixture was then cooled, poured onto crushed ice and diluted with 25 ml. of cold sulfuric acid. The resulting mixture was extracted with ether and the extract washed successively with water, saturated sodium bicarbonate solution, and water. The extract was dried over anhydrous sodium sulfate and the ether blown off under nitrogen leaving 5.18 g. of 4-methyl-4-hydroxy-6-(2,6,6-trimethyl-cyclohex-1-enyl) hexa-5-ene-1-yne as a clear yellow, slightly viscous liquid. Infra red analysis confirmed disappearance of the ketone and the characteristic triple bond and hydroxyl group of the acetylenic carbinol.

*Example 3*

A mixture of 1.34 g. of magnesium turnings, 10 ml. of absolute ether and 75 mg. of mercuric chloride was charged into a reaction flask. To this mixture was added a solution of 6.55 g. propargyl bromide and 6.62 g. of the dimethoxy acetal of acetoacetaldehyde in 50 ml. of absolute ether. The reaction mixture was warmed for about 10 minutes to initiate the reaction, after which time the reaction proceeded vigorously without heating for 30 minutes while being controlled with cooling in an ice-water bath. The mixture was then heated to reflux for an additional 30 minutes and was stirred during such additional reflux. A 5% aqueous solution of sulfuric acid was added cautiously to hydrolyze the magnesium complex. The ether phase was separated out, and the aqueous phase extracted with additional ether. The ether extracts were combined, washed with saturated sodium bicarbonate solution and dried over anhydrous sodium sulfate. The ether was removed by evaporation to give 7.88 g. of crude 1,1-dimethoxy-3-methyl-3-hydroxy hex-5-yne which was then fractionated under vacuum to give 3.76 g. of such acetylenic carbinol having a boiling point of 60° C. at 3 mm. Hg. Similar results are obtained with other well-known ketones.

Thus by means of this invention acetylenic carbinols are prepared in high yield by means of magnesium without undesirable side reactions such as coupling of the propinyl halide.

The invention has been described in considerable detail with reference to certain preferred embodiments but it will be understood that variations and modifications therein can be effected without departing from the spirit and scope of the invention as described hereinabove and as defined in the appended claims.

I claim:

1. The method of making an acetylenic carbinol which comprises condensing an aliphatic ketone of the group consisting of acyclic and alicyclic ketones with a propargyl halide in the presence of mercury-catalyzed magnesium, and hydrolyzing the resulting condensation product to an acetylenic carbinol.

2. The method of making an acetylenic carbinol which comprises condensing an aliphatic ketone of the group consisting of alicyclic and acyclic ketones with a propargyl halide in the presence of magnesium and a mercury-containing material, and hydrolyzing the resulting condensation product to an acetylenic carbinol.

3. The method of making an acetylenic carbinol which comprises condensing an aliphatic ketone of the group consisting of alicyclic and acyclic ketones with a propargyl halide in the presence of magnesium and a mercury salt, and hydrolyzing the resulting condensation product to an acetylenic carbinol.

4. The method of making an acetylenic carbinol which comprises condensing an alicyclic ketone with propargyl bromide in the presence of mercury-catalyzed magnesium, and hydrolyzing the resulting condensation product to an acetylenic carbinol.

5. The method of making an acetylenic carbinol which comprises condensing an alicyclic ketone with propargyl iodide in the presence of mercury-catalyzed magnesium, and hydrolyzing the resulting condensation product to an acetylenic carbinol.

6. The method of making an acetylenic carbinol which comprises condensing an aliphatic ketone of the group consisting of alicyclic and acyclic ketones with a propargyl halide in the presence of a magnesium amalgam, and hydrolyzing the resulting condensation product to an acetylenic carbinol.

7. The method of making an acetylenic carbinol which comprises condensing β-ionone with a propargyl halide in the presence of mercury-catalyzed magnesium, and hydrolyzing the product of said condensing to an acetylenic carbinol.

8. The method of making an acetylenic carbinol which comprises condensing an acetal of acetoacetaldehyde with a propargyl halide in the presence of mercury-catalyzed magnesium, and hydrolyzing the resulting condensation product.

9. The method of making an acetylenic carbinol which comprises condensing β-ionone with a propargyl halide in the presence of magnesium and a mercury salt, and hydrolyzing the resulting condensation product.

10. The method of making an acetylenic carbinol which comprises condensing an acetal of acetoacetaldehyde with a propargyl halide in the presence of magnesium and a mercury salt, and hydrolyzing the resulting condensation product.

11. The method which comprises condensing β-ionone with propargyl bromide in the presence of magnesium and a mercury salt, and hydrolyzing the resulting condensation product.

12. The method which comprises condensing a dialkoxy acetal of acetoacetaldehyde with propargyl bromide in the presence of magnesium and a mercury salt, and hydrolyzing the resulting condensation product.

13. The method which comprises condensing a ketone with propargyl bromide in the presence of magnesium and a mercury salt, and hydrolyzing the resulting condensation product to an acetylenic carbinol.

14. In the process of condensing an aliphatic ketone from the group consisting of alicyclic and acyclic ketones with a propargyl halide, the improvement which comprises effecting the condensation in the presence of mercury-catalyzed magnesium.

15. In the process of condensing β-ionone with propargyl bromide, the improvement which comprises effecting the condensation in the presence of mercury-catalyzed magnesium.

16. In the process of condensing a dialkoxy acetal of acetoacetaldehyde with propargyl bromide, the improvement which comprises effecting the condensation in the presence of mercury-catalyzed magnesium.

References Cited in the file of this patent

UNITED STATES PATENTS

| | | |
|---|---|---|
| 2,451,740 | Lindlar | Oct. 19, 1948 |
| 2,540,116 | Huber et al. | Feb. 6, 1951 |

FOREIGN PATENTS

| | | |
|---|---|---|
| 626,392 | Great Britain | July 14, 1949 |

OTHER REFERENCES

Zeile et al.: Berichte, vol. 75, pp. 356–362 (1942).

Golse et al.: Bull. Soc. Chimique de France, 1950, pp. 285–288.

Prevost et al.: Comp. Rend., vol. 230, pp. 1186–1188 (1950).